United States Patent
Sekula et al.

(12) 
(10) Patent No.: US 6,235,335 B1
(45) Date of Patent: *May 22, 2001

(54) METHOD OF MAKING A REDUCED CALORIE RECONSTITUTED MILK COMPOSITION

(75) Inventors: Bernard C. Sekula, Glen Gardner; Krystyna U. Tancibok, Union, both of NJ (US)

(73) Assignee: Bestfoods, Englewood Cliffs, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/572,277

(22) Filed: Dec. 13, 1995

(51) Int. Cl.$^7$ .................................................. A23C 9/00
(52) U.S. Cl. ...................... 426/585; 426/580; 426/587; 426/588; 426/601; 426/613
(58) Field of Search ...................... 426/601, 611, 426/531, 311, 603, 606, 612, 656, 658, 580, 585, 586, 587, 588, 613

(56) References Cited

U.S. PATENT DOCUMENTS

| | | | |
|---|---|---|---|
| 3,600,186 | 8/1971 | Mattson et al. | 99/1 |
| 4,789,664 | 12/1988 | Seligson et al. | 514/23 |
| 4,849,242 | 7/1989 | Kershner | 426/601 |
| 4,861,613 | 8/1989 | White et al. | 426/611 |
| 4,983,329 | 1/1991 | Cooper | 260/410.7 |
| 5,273,772 * | 12/1993 | Cooper | 426/611 |
| 5,288,884 * | 2/1994 | Cooper | 554/168 |
| 5,304,665 | 4/1994 | Cooper et al. | 554/149 |
| 5,308,634 | 5/1994 | Cooper | 426/531 |
| 5,362,894 * | 11/1994 | Handwerker et al. | 554/169 |
| 5,374,446 * | 12/1994 | Ferenz et al. | 426/611 |
| 5,376,398 * | 12/1994 | Cooper et al. | 426/611 |
| 5,378,478 | 1/1995 | Miller et al. | 426/40 |
| 5,399,729 | 3/1995 | Cooper et al. | 554/149 |
| 5,427,815 * | 6/1995 | Ferenz | 426/611 |
| 5,486,372 | 1/1996 | Martin et al. | 426/565 |
| 5,494,693 | 2/1996 | Cooper | 426/531 |
| 5,512,313 * | 4/1996 | Cooper et al. | 426/611 |
| 5,516,544 * | 5/1996 | Sekula et al. | 426/611 |

FOREIGN PATENT DOCUMENTS

| | | |
|---|---|---|
| 0236288 | 9/1987 | (EP) . |
| 0571218 | 11/1993 | (EP) . |
| 0571219 | 11/1993 | (EP) . |
| 0290420 | 1/1994 | (EP) . |
| 0651947 | 5/1995 | (EP) . |

* cited by examiner

*Primary Examiner*—Leslie Wong
(74) *Attorney, Agent, or Firm*—Norris, McLaughlin & Marcus

(57) ABSTRACT

Reduced calorie reconstituted milk and milk products are prepared by replacing some or all of the fat in reconstituted milk with a fatty acid-esterified propoxylated glycerin composition which has solid fat index as measured by dilatometry of more than about 25 at 92° F., preferably less than about 70 at 92° F., and less than about 10 at 104° F. The reconstituted milk and milk products of the invention have a smooth texture, excellent stability and significantly reduced calories.

4 Claims, No Drawings

METHOD OF MAKING A REDUCED CALORIE RECONSTITUTED MILK COMPOSITION

BACKGROUND OF THE INVENTION

1. Field of the Invention

The present invention has to do with reduced calorie reconstituted milk and milk products which are similar to full-fat milk products in taste, texture and applications. More specifically, the invention relates to milk fat replacement compositions comprised of a fatty acid-esterified propoxylated glycerin composition which provides a smooth texture and excellent stability in reconstituted milk, and products made with reconstituted milk, having significantly reduced calories.

2. Description of the Related Art

Milk products comprise a significant part of the human diet. In the United States, for example, milk products are said to comprise about one-sixth of the weight of food eaten by the average family. About forty percent of the milk produced is consumed as fluid milk and cream and the remainder is used in the manufacture of dairy products.

Reconstituted milk is conventionally prepared by recombining milk components with water. Most often, the only ingredients used to reconstitute milk are skim milk powder, butter and water. The ingredients must be properly homogenized in order to retain them in a suspension. The butter ingredient is a saturated fat containing cholesterol and is highly caloric. If the butter is omitted during reconstitution, the resulting skim milk will have limited usage due to the fat-starved perception in taste when consumed alone or in other foods made with the milk.

Fat replacement compositions which have been developed for use in low calorie fat-containing foods are known. An early development employing sugar fatty acid esters is described in U.S. Pat. No. 3,600,186, but the compositions are not described as suitable for use as replacements for milk fat in milk products.

The use of sucrose polyesters as fat replacement compositions is disclosed in U.S. Pat. No. 4,789,664 for foods described as having blood cholesterol lowering properties. Milk-type beverages are made according to the patent by replacing all or a portion of the total fat with sucrose polyester.

In European Patent Application 0 236 288, low calorie fat materials are described which include sugar fatty acid polyesters, polyglycerol fatty acid esters and tricarboxylic acids esterified with fatty alcohols. The materials are said to be useful in a wide variety of food products, including milk, cheeses and other fat-containing dairy products. Polyol polyesters and their use as fat replacements in foods also are described in European Patent Specification 0 290 420. The polyesters are said to be useful to make milk, cream, coffee creamer and other dairy beverages and dairy desserts.

All of the low calorie fat replacement compositions discussed above have drawbacks either in the processes which employ them or in the flavor and mouthfeel characteristics of the finished reduced fat products.

Reduced calorie food compositions containing fat-type organoleptic ingredients are known wherein an esterified epoxide-extended polyol is employed as a full or partial replacement for vegetable oils and fats. Fat substitutes of this type are disclosed in U.S. Pat. No. 4,861,613 to White et al. (referred to herein as "White" and incorporated by reference herein in its entirety). However, it has not heretofore been known how to prepare such substances so as to render them suitable for use as milk fat replacement compositions in reconstituted milk and products made using reconstituted milk as an ingredient.

The products of the invention have a smooth texture and provide the mouthfeel and taste characteristics of full-fat milk. The products successfully minimize or avoid anal leakage while still providing the requisite functionality in a food product and the stability of the products is excellent. Examples of products of the invention include low calorie hot and cold milk beverages, cream, puddings, whipped toppings, coffee whiteners and the like.

All parts and percentages set forth herein are by weight unless otherwise specified.

All references to measurements by dilatometry herein follow AOCS Method Cd 10-57 (available from American Oil Chemists' Society, 1608 Broadmoor Dr., Champaign, Ill. 61821-5930 USA).

SUMMARY OF THE INVENTION

The milk fat replacement compositions of the invention are comprised of fatty acid-esterified propoxylated glycerin compositions which have solid fat indices as measured by dilatometry of more than about 25 at 92° F., and preferably less than about 70 at 92° F., and less than about 10 at 104° F. Accordingly, the milk fat replacement compositions surprisingly have a higher melting profile (or melting curve) than natural milk fat and yet they provide the textural and stability characteristics associated with natural milk fat.

The fatty acid-esterified propoxylated glycerin compositions (sometimes referred to herein as "EPG" in the singular form and as "EPGs" in the plural form) are made by incorporating propylene oxide (sometimes referred to herein as "oxypropylene" or "PO") groups into a typical triglyceride fat as described in White. The triglyceride fat (fatty acid) can be one fatty acid or a blend of fatty acids. The average number of PO groups which are incorporated into a triglyceride is called the propoxylation number. The melting point and other characteristics of the composition can be modified by varying the number of oxypropylene groups, the fatty acid chain length and the level of unsaturation.

In the present invention, a particularly preferred embodiment of the low calorie, reconstituted milk products employs as a fat replacement ingredient an EPG which is prepared by the propoxylation of glycerol to a propoxylation number of about 5 followed by esterification with a blend of about nine parts fully hydrogenated rapeseed oil fatty acids and about one part liquid soybean oil fatty acids and hydrogenation to a final IV of $\leq$ about 10, referred to herein as EPG-05 9HR/1LS(IV$\leq$10), preferably to a final IV of from about 2–6, referred to herein as EPG-05 9HR/1LS(IV=2–6).

DETAILED DESCRIPTION OF THE INVENTION

The fatty acid-esterified propoxylated glycerin compositions of this invention function effectively as reduced calorie milk fat replacement compositions which are suitable for use in reconstituted milk and products made using reconstituted milk as an ingredient, even though the EPG employed, unlike milk fat, may have a high solids content at temperatures above about 92° F. (33° C.). The EPG's of the invention have more affinity for water than does oil and the products of the invention therefore are stable emulsions. Accordingly, it has now been unexpectedly found that a high-melting, fatty acid-esterified propoxylated glycerin composition can provide the desirable texture and stability properties of milk fat when the propoxylation number and the type and/or relative proportions of fatty acid acyl groups present are carefully controlled to obtain EPGs having solid fat indices as measured by dilatometry of more than about 25 at 92° F., and preferably less than about 70 at 92° F., and less than about 10 at 104° F. In particular, it has been unexpectedly found that an EPG containing fully hydrogenated rapeseed oil fatty acids and liquid soybean oil fatty acids in about a 9 to 1 ratio and having a propoxylation number of about 5 and a final IV of ≦about 10, preferably from about 2–6, can be used as a milk fat replacement composition to replace the milk fat in reconstituted milk.

The fatty acid-esterified propoxylated glycerin compositions of this invention contain glyceryl residues, oxypropylene units, and fatty acid acyl

groups. Typically, the compositions are mixtures of individual fatty acid-esterified propoxylated glycerin compounds which may differ from each other in degree of propoxylation and acyl group composition. The glyceryl residue may have the generic structure

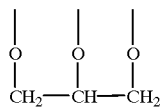

and is derived from glycerin

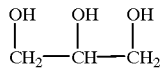

or a glycerin equivalent. The oxypropylene units are generally interspersed between glyceryl residues and the acyl groups and have the structure

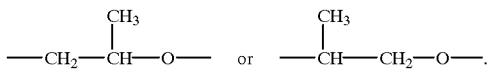

Typically, more than one oxypropylene unit may be present between an oxygen of an individual glyceryl residue and an acyl group such that a polyoxypropylene unit is created. However, a single "branch" or "arm" of the fatty acid-esterified propoxylated glycerin may contain only one oxypropylene unit. Certain of the acyl groups may be attached directly to the glyceryl residue, without any intervening oxypropylene units, although an average of at least about 3 oxypropylene units per glyceryl residue must be present in the overall composition. The average number of oxypropylene units in the fatty acid-esterified propoxylated glycerin composition is from about 3 to about 16. The presence of oxypropylene units is critical, as the oxypropylene units help to lower the melting point of the compositions thereby improving the mouthfeel and melting characteristics as compared to analogous compositions not containing oxypropylene units.

In order to maximize the resistance of the fatty acid-esterified propoxylated glycerin composition towards pancreatic lipase enzyme-catalyzed hydrolysis, the oxypropylene units adjacent to the acyl groups should be oriented such that secondary rather than primary ester linkages are created. That is, the methyl group should be located on the carbon atom attached to the oxygen atom forming part of the ester linkage as follows:

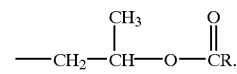

Preferably, at least 80% of the ester linkages in the overall composition are secondary. Most preferably, at least about 95% of the ester linkages are secondary. However, the secondary ester content can be less than about 80% without adversely affecting the properties of the EPGs of the invention which enable them to be used as replacements for milk fat in reconstituted milk.

It is desirable for the fatty acid-esterified propoxylated glycerin composition to be substantially esterified such that it has an average of at least about 2.5 (more preferably, at least about 2.9) fatty acid acyl groups per equivalent of glycerin. The extent of esterification may be readily determined by conventional analytical methods such as hydroxyl number.

The structure of the composition preferably is such that the composition has a porcine pancreatic lipase hydrolysis rate of less than about 10% as compared to an olive oil standard. Preferably, the relative hydrolysis rate is less than about 1% of the olive oil rate. Methods of measuring porcine pancreatic lipase hydrolysis rate are described in White.

The average number of oxypropylene units in the EPG must not be so low as to result in a high proportion of the acyl groups being attached directly to glyceryl residues since such directly attached acyl groups will be nearly as susceptible to enzymatic cleavage as the acyl groups in a conventional fully digestible triglyceride, thus reducing the usefulness of the composition as a low calorie fat substitute. At the same time the average number of oxypropylene units should not exceed about 16.

The melting point for a given EPG may be adjusted as needed by varying the average number of oxypropylene units per glycerin (propoxylation number) present in the composition. At a constant fatty acid acyl group content (i.e., if the relative proportions of the different acyl groups present are fixed), the solid fat index at a particular temperature will increase as the propoxylation number is decreased and will decrease as the propoxylation number is increased. As the average number of fatty acid acyl group carbons per equivalent of glycerin decreases or as the iodine number of the composition increases (as a result of increasing the proportion of unsaturated fatty acid acyl groups present), the average number of oxypropylene units per glycerin will need to be decreased to maintain the solid fat index at a given temperature above a predetermined target value. If a particular fatty acid-esterified propoxylated glycerin composition has an undesirably high solid fat index at a given temperature the index may be brought below a predetermined target value by increasing the propoxylation number. By so adjusting the average number of oxypropylene units per equivalent of glycerin, the melting point of each EPG may be controlled.

Suitable EPGs may be prepared using either fatty acids or fatty acid derivatives such as fatty acid esters, fatty acid halides, or fatty acid anhydrides. Generally speaking, $C_{12}$–$C_{24}$ saturated linear fatty acids and their derivatives can be used as starting materials for preparing the EPGs of the present invention.

In addition, the iodine number (which reflects the proportion of unsaturated fatty acid acyl groups in the composition) must be less than about 30, more preferably is less than about 20, and most preferably is less than about 10 centigrams $I_2$ per gram of the composition. A relatively minor proportion of unsaturated fatty acid acyl groups may be advantageous, however, in order to ensure that the composition does not melt over an excessively narrow range. Iodine number (also referred to as iodine value) may be measured by AOCS method Cd 1-25.

The $C_{12}-C_{24}$ saturated fatty acid is linear (i.e., non branched) and preferably contains only one carboxylic acid functionality. The acyl group may thus correspond to the general structure

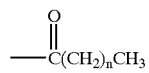

wherein n is an integer of from 10 to 22. The value of n is most conveniently an even number (e.g., 10, 12, 14, 16, 18, 20, or 22) since the corresponding fatty acids are readily available at low cost from natural sources such as edible triglycerides. Specific illustrative fatty acids suitable for use as this component of the fatty acid-esterified propoxylated glycerin compositions include, but are not limited to lauric acid, myristic acid, stearic acid, palmitic acid, eicosanoic (arachidic) acid, heneicosanoic acid, docosanoic (behenic) acid, tricosanoic acid, and tetracosanoic (lignoceric) acid. Mixtures of these $C_{12}-C_{24}$ saturated linear fatty acids may also be utilized to advantage, as discussed above.

While all of the acyl groups in the fatty acid-esterified propoxylated glycerin composition may be derived from $C_{12}-C_{24}$ saturated linear fatty acid, the compositions may contain minor amounts of acyl groups derived from other $C_8-C_{24}$ fatty acids. Preferably, the proportion of such other acyl groups is less than 40%. Generally speaking, the incorporation of acyl groups which are relatively shorter in length ($C_8-C_{18}$), unsaturated, and/or branched will tend to decrease the melting point of the resulting EPG.

The fatty acids which optionally may be used in combination with the required $C_{12}-C_{24}$ saturated linear fatty acids may be any of the known fatty acids such as caprylic acid, pelargonic acid, capric acid, oleic acid, cetoleic acid, palmitoleic acid, gadoleic acid, erucic acid, ricinoleic acid, linoleic acid, linolenic acid, myristoleic acid, eleostearic acid, arachidonic acid, or mixtures of these acids. Preferably, linear monocarboxylic acids containing from 0 to 5 double bonds are employed.

The proportions and chemical structures of the fatty acid acyl groups in the milk fat replacement compositions of this invention should be selected such that the solid fat indices of the compositions as determined by dilatometry are more than about 25 at 92° F., preferably less than about 70 at 92° F., and less than about 10 at 104° F. Increasing the ratio of average number of fatty acid acyl group carbons per equivalent of glycerin will shift the melting point of an EPG to a higher average temperature while decreasing the ratio will shift the melting point to a lower average temperature.

The average number of fatty acid acyl group carbons per equivalent of glycerin in the fatty acid-esterified propoxylated glycerin compositions of the invention may be readily calculated from a knowledge of the fatty acid acyl group content (i.e., the chemical structures and relative proportions of the fatty acids used to prepare the compositions). The following formula may be used to calculate this average number ($N_a$) for an esterified propoxylated glycerin composition prepared using fatty acids A and B:

$$N_a = \frac{\text{moles } A \times \text{no. carbons in } A}{\text{moles propoxylated glycerin}} + \frac{\text{moles } B \times \text{no. carbons in } B}{\text{moles propoxylated glycerin}}$$

For example, a composition prepared by reacting a mixture of 1.5 moles of stearic acid (a $C_{18}$ fatty acid) and 1.5 moles of eicosanoic acid (a $C_{20}$ fatty acid) with 1 mole of propoxylated glycerin containing an average of 7 oxypropylene units per glycerin will have an average of 57 fatty acid acyl carbons per equivalent of glycerin.

To minimize the available caloric content of the fatty acid-esterified propoxylated glycerin milk fat replacement compositions of this invention, the chemical composition should be selected such that the number average molecular weight is at least about 800. More preferably, the minimum molecular weight is about 1000. In order for the fatty acid-esterified propoxylated glycerin composition to function as a suitable replacement for milk fat it is also desirable that the number average molecular weight not exceed about 2200. Preferably, the molecular weight is below about 2000.

In a preferred embodiment of the invention, behenic (i.e. saturated $C_{22}$) acid-containing fatty acid compositions are employed. Fatty acid compositions which are relatively high in behenic acid content, having at least about 30% and preferably at least about 35% by weight of $C_{22}$ saturated fatty acid, are most preferred. It is also preferred that the behenic acid content of such compositions not exceed about 60% by weight; more preferably, the behenic acid content is not in excess of about 50% by weight. The balance of the fatty acids may be any of the fatty acids previously discussed. In a preferred embodiment of the invention, however, the balance of the fatty acids are predominately stearic ($C_{18}$ saturated) fatty acid. The fatty acid composition thus may comprise as much as about 70% by weight stearic acid.

Sources of behenic acid and stearic acid are well-known. For example, the fatty acids derived from rapeseed oil contain a relatively high proportion (typically about 30 to about 50 weight %) of $C_{22}$ fatty acids. The erucic acid present may be readily converted by hydrogenation to behenic acid, either before or after incorporation into the fatty acid-esterified propoxylated glycerin composition. A number of vegetable oils are known which contain high proportions (typically about 70 to about 95 weight %) of $C_{18}$ fatty acids. The unsaturated $C_{18}$ fatty acids present may be hydrogenated before or after incorporation into the fatty acid-esterified propoxylated glycerin composition. Illustrative vegetable oils of this type include, but are not limited to, soybean oil, corn oil, cottonseed oil, olive oil, peanut oil, canola oil, safflower oil, sesame oil, sunflower oil, and the like. Fatty acids derived from mixtures of such oils may also be utilized to advantage.

One specific type of EPG suitable for use in accordance with the present invention is a fatty acid-esterified propoxylated glycerin composition having an average number of oxypropylene units of from about 4 to about 6 and an iodine value (also referred to herein as "IV") of from about 2 to about 6, wherein the fatty acids are comprised of about 35 to about 45% by weight behenic acid and about 35 to about 45% by weight stearic acid (the balance of the fatty acids being any of the other known fatty acids).

In another desirable embodiment, the fatty acid-esterified propoxylated glycerin composition has an iodine value less than or equal to about 10 (i.e., 0–10) and is obtainable by esterifying a propoxylated glycerin having an average number of oxypropylene units of from about 4 to about 6 with a fatty acid mixture wherein from about 80 to about 95 weight % of the fatty acid mixture are derived from rapeseed oil and the balance of said fatty acids are derived from a vegetable oil selected from the group consisting of soybean oil, corn oil, cottonseed oil, olive oil, peanut oil, canola oil, safflower oil, sesame oil, sunflower oil, and mixtures thereof.

A particularly preferred EPG of the invention is made by preparing a mixture of about 90% by weight hydrogenated rapeseed fatty acid and about 10% by weight soya fatty acid and esterifying the mixture with propoxylated glycerol to synthesize a crude EPG. The product is a fatty acid-esterified propoxylated glycerin composition having an average number of oxypropylene units per equivalent of glycerin (propoxylation number) of about 5, an iodine number less than about 5, an average number of fatty acid acyl group carbons per equivalent of glycerin of from about 54 to about 60, and a drop melting point (also called a dropping point as measured by the Mettler Dropping Point method, AOCS Official Method Cc 18-80(93)) of from about 102 to about 110° F.

The fatty acid-esterified propoxylated glycerin milk fat replacement compositions of this invention may be prepared using any suitable method. In general, the procedures described in the prior art for synthesizing other fatty acid-esterified propoxylated glycerin compositions will be appropriate for use provided that the necessary $C_{12}$–$C_{24}$ saturated linear fatty acids or fatty acid derivatives are employed in the esterification step. Such procedures are described, for example, in U.S. Pat. No. 4,861,613 (the White patent, referenced above) and U.S. Pat. No. 4,983,329, and in European Patent Publication No. 353,928, the disclosures of which are incorporated by reference herein in their entireties. As is explained in more detail in the above-mentioned publications, either fatty acids or fatty acid equivalents such as fatty acid esters, fatty acid halides, or fatty acid anhydrides may actually be employed in the esterification. The $C_{12}$–$C_{24}$ saturated linear fatty acid acyl groups may also be introduced by using $C_{12}$–$C_{24}$ unsaturated fatty acids in the esterification step and then hydrogenating the esterified propoxylated glycerin composition to increase the proportion of $C_{12}$–$C_{24}$ saturated linear fatty acid acyl groups to the desired level. Any residual free fatty acid remaining in the composition after esterification should preferably be removed or reduced as much as possible to minimize problems with off flavor, off-odor, or storage stability.

The fatty acid-esterified propoxylated glycerin compositions of the present invention are particularly suitable for use as full or partial replacements for milk fat in reconstituted milk and products made using reconstituted milk. Regular milk has a fat content of about 3–6% and in order to achieve a significant reduction in available caloric content, it will generally be desirable for at least about 33% by weight of the fat component to be replaced by a fatty acid-esterified propoxylated glycerin composition of this invention. The balance of the fat component may be milk fat or a different milk fat substitute, equivalent or mimetic. The amount of the milk fat replacement composition of the invention may, if desired, constitute up to 100% of the total fat in the product.

In addition to the fat component comprised of the fatty acid-esterified propoxylated glycerin composition, the reconstituted milk product of the invention may be employed in one or more conventional food products which employ reconstituted milk as an ingredient. A sugar alcohol such as sorbitol, xylitol, or mannitol or a reduced calorie sweetener such as saccharine, aspartame, cyclamates, sucralose, acesulfame, acesulfam-K, or the like may also be employed in combination with the fatty acid-esterified propoxylated glycerin composition of the invention.

Food products of the invention may be readily prepared by employing the reduced calorie reconstituted milk compositions of the invention as a replacement for some or all of the reconstituted milk required by a recipe.

The EPGs utilized in the examples of the invention were synthesized from soybean fatty acid and hydrogenated rapeseed fatty acid and were physically refined. The resulting materials were hydrogenated to near saturation (IV<about 6), bleached and deodorized. The deodorized products were fortified with a mixed tocopherol blend of 50% Covi-ox T70 and 50% Covitol F1300 (available from Henkel Corp., La Grange, Ill., U.S.A.) to a level of up to about 0.16%. The finished products were characterized using analytical methods commonly used by the industry to evaluate oils and fats. These methods included Wijs iodine value (AOCS Cd 1-25), dropping point (AOCS Cc 18-80 (93)) and solid fat index (AOCS Cd 10-57).

EXAMPLES

Example 1

Hydrogenated rapeseed fatty acid (1423 kg) was blended with soybean fatty acid (140 kg) to make a free fatty acid blend. The blend was reacted with propoxylated glycerin having a propoxylation number of 5 using the procedures described in U.S. Pat. No. 4,983,329. The esterified product was physically refined, hydrogenated, bleached and deodorized. The hydrogenated product was fortified by blending with 0.15% tocopherol blend (50% Covi-ox T70 and 50% Covitol F1300) for 30 minutes at 60° C. in a nitrogen atmosphere. The product was transferred to a belt dryer, grated and packaged.

Example 2

The grated product of Example 1 was analyzed and found to have an iodine value of 3.9 and a dropping point of 109.9. The solid fat index ("SFI") as determined by dilatometry was as follows:

| TEMP° F. | SFI |
|---|---|
| 50 | 74.3 |
| 70 | 67.4 |
| 80 | 62.4 |
| 92 | 45.9 |
| 104 | 2.6 |

Example 3

The following compositions represent the typical fat and solids component contents for milk and creams.

| TYPE | FAT % | SOLIDS-NON-FAT % | TOTAL SOLIDS % |
|---|---|---|---|
| Whole Milk | 4.4 | 8.6 | 13 |
| Light Cream | 16–22 | 7.4–6.9 | 23.4–28.9 |
| Medium Cream | 23–29 | 6.3–6.8 | 29.8–35.3 |
| Whipping Cream | 30–35 | 5.7–6.2 | 36.2–41 |
| Heavy Cream | 36–55 | 4–5.7 | 41.7–54.4 |

The general procedure according to the invention is as follows:
1. The fat component is replaced with the grated product of Example 1 and the remaining solids requirements are filled with non-fat dry milk ("NFDM").

2. The entire composition then is dispersed with a wire whisk, heated to 160° F. in a water bath and held at this temperature for 30 minutes to pasteurize.
3. The mixture is then homogenized at high speed for 5 minutes, then cooled in the refrigerator or in an ice bath.
4. The products obtained may be used in any conventional application suitable for each type of natural milk product.

Example 4

A low calorie reconstituted milk having the fat equivalent for whole milk (4.4%) replaced with the composition of Example 1 was prepared in the following manner:

a) 870.0 g of hot water (160° F.) were used to dissolve 86.0 g of NFDM solids.

b) 44 g. of a flaked version of the product of Example 1 were added to the hot mix and stirred vigorously to dissolve.

c) This was followed by pasteurizing at 160° F. for ½ hr; then homogenizing for 5 minutes.

d) The pasteurized/homogenized product was poured into a 250 mil cylinder for observation and it was left in the refrigerator overnight. No separation was noticed the next morning.

Example 5

A low calorie reconstituted whipping cream having the fat equivalent for whipping cream (30–35%) replaced with the composition of Example 1 was prepared in the following manner:

a) 587.5 g of hot water (160° F.) were used to dissolve 60.0 g of NFDM solids and the mixture was stirred with a wire whisk.

b) 350.0 g of the flaked composition of Example 1 were added to the hot mix and stirred further with a wire whisk to dissolve.

c) The mix was held at 160° F. in hot water bath for 30 minutes for pasteurization.

d) 2.5 g of natural cream flavor was added and mixed in.

e) The entire mass was homogenized for 5 minutes at high speed. It had a very smooth cream-like texture.

f) The cream was whipped with some powdered sugar and natural vanilla flavor resulting in a smooth, soft-peak whipped cream.

Example 6

Store-bought skim milk (956 g) was heated to 180° F. in a boiling water bath and 44 g of the flaked EPG product of Example 1 was added followed by stirring thoroughly with a wire whisk. When all of the EPG was melted the milk was homogenized at high speed for 5 minutes. This was followed by cooling the milk in an ice bath while stirring with the wire whisk.

The resulting milk had a full body, like natural whole milk, good flavor and smooth texture.

Example 7

An instant Jello® chocolate pudding was prepared in the following manner:

1. A large box of 173 g of pudding mix was divided into 3 portions, 57.5 g each.
2. Each portion of pudding mix was placed into a pint jar and formulated as follows:

a) 250 mls of skim milk were added to one jar;

b) 250 mls of the product of Example 6 was added to a second jar; and c) 250 mls natural whole milk was added to a third jar.
3. The jars were capped tightly and separately shaken for 1 minute each.
4. The puddings were poured into plastic tubs and left to set. The following observations were made when the puddings set:

a) The skim milk pudding was very dark and glossy in color. It lacked richness of flavor and it had a typical "fat-starved" taste, although it tasted very smooth and sweet.

b) The pudding made with the product of Example 6 gave the smallest yield, tasted rich and creamy and satisfied like the natural milk pudding described below. It was much better than the skim milk pudding, although not as rich as the natural whole milk pudding.

c) The whole milk pudding had a rich creamy, smooth taste and a much lighter shade of brown color which made it look full-bodied and good.

What is claimed is:

1. A method of making a reduced calorie reconstituted milk composition having a fat component comprising replacing from about 33% to about 100% of the fat component with a fatty acid-esterified propoxylated glycerin composition having a solid fat index as measured by dilatometry of more than about 25 at 92° F. and between about 10 and 2.6 at 104° F.

2. The method of claim 1 wherein the fatty acid-esterified propoxylated glycerin composition has a solid fat index as measured by dilatometry of less than about 70 at 92° F.

3. The method of claim 2 wherein the fatty acid-esterified propoxylated glycerin composition has an average number of oxypropylene units per equivalent of glycerin of from about 4 to 6 and an iodine value of from about 2 to 6, wherein the fatty acids are comprised of about 35 to 45% by weight behenic acid and about 35 to 45% by weight stearic acid.

4. A method of making a reduced calorie reconstituted milk composition having a fat component comprising replacing from about 33% to about 100% of the fat component with a fatty acid-esterified propoxylated glycerin composition having a solid fat index as measured by dilatometry of about 67.4 at 70° F. about 45.9 at 92° F. and about 2.6 at 104° F.

* * * * *